US012659779B2

(12) United States Patent
Hofmann et al.

(10) Patent No.: US 12,659,779 B2
(45) Date of Patent: Jun. 16, 2026

(54) METHOD, APPARATUS AND COMPUTER PROGRAM

(71) Applicant: Nokia Technologies Oy, Espoo (FI)

(72) Inventors: Sandra Hofmann, Munich (DE); Jeroen Wigard, Klarup (DK); Frank Frederiksen, Klarup (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 417 days.

(21) Appl. No.: 18/275,075

(22) PCT Filed: Feb. 3, 2021

(86) PCT No.: PCT/EP2021/052528
§ 371 (c)(1),
(2) Date: Jul. 31, 2023

(87) PCT Pub. No.: WO2022/167067
PCT Pub. Date: Aug. 11, 2022

(65) Prior Publication Data
US 2024/0107355 A1      Mar. 28, 2024

(51) Int. Cl.
*H04W 84/06* (2009.01)
*H04B 17/318* (2015.01)
*H04W 24/10* (2009.01)

(52) U.S. Cl.
CPC .......... *H04W 24/10* (2013.01); *H04B 17/328* (2023.05); *H04W 84/06* (2013.01)

(58) Field of Classification Search
CPC . H04W 24/10; H04W 84/06; H04W 36/0088; H04B 17/328; H04B 7/18504; H04B 7/18513; H04B 7/18541
See application file for complete search history.

(56) References Cited

U.S. PATENT DOCUMENTS

| | | | |
|---|---|---|---|
| 2013/0210435 A1 | 8/2013 | Dimou et al. ................. | 455/436 |
| 2015/0195758 A1* | 7/2015 | Kim ....................... | H04W 24/10 |
| | | | 370/252 |
| 2023/0269635 A1* | 8/2023 | Xu ........................ | H04W 36/08 |
| | | | 370/329 |

FOREIGN PATENT DOCUMENTS

WO      WO 2020/229445 A1      11/2020

OTHER PUBLICATIONS

InterDigital Inc., "Report of Email Discussion [106#73][NR/NTN] Mobility issues and solutions," 3GPP RAN WG2 Meeting #107, R2-1910961, Prague, Czech Republic, Aug. 26-Aug. 30, 2019.

* cited by examiner

*Primary Examiner* — Chuong A Ngo
(74) *Attorney, Agent, or Firm* — Carter, DeLuca & Farrell LLP

(57) ABSTRACT

There is provided an apparatus in a user equipment, the apparatus comprising including: one or more processors, and memory storing instructions that, when executed by the one or more processors, cause the apparatus to: perform measurements on signals received from a target network entity, wherein the user equipment is connected to a serving network entity and calculate a variance of the measurements over a time period. The one or more processors, and memory storing instructions, when executed by the one or more processors, further cause the apparatus to, in response to determining that the calculated variance is above a threshold value, adjust the transmission of a measurement report from the user equipment.

1 Claim, 10 Drawing Sheets

200

214

213

212

211a

215

211b

507

Satellite
visible area

503

505

501

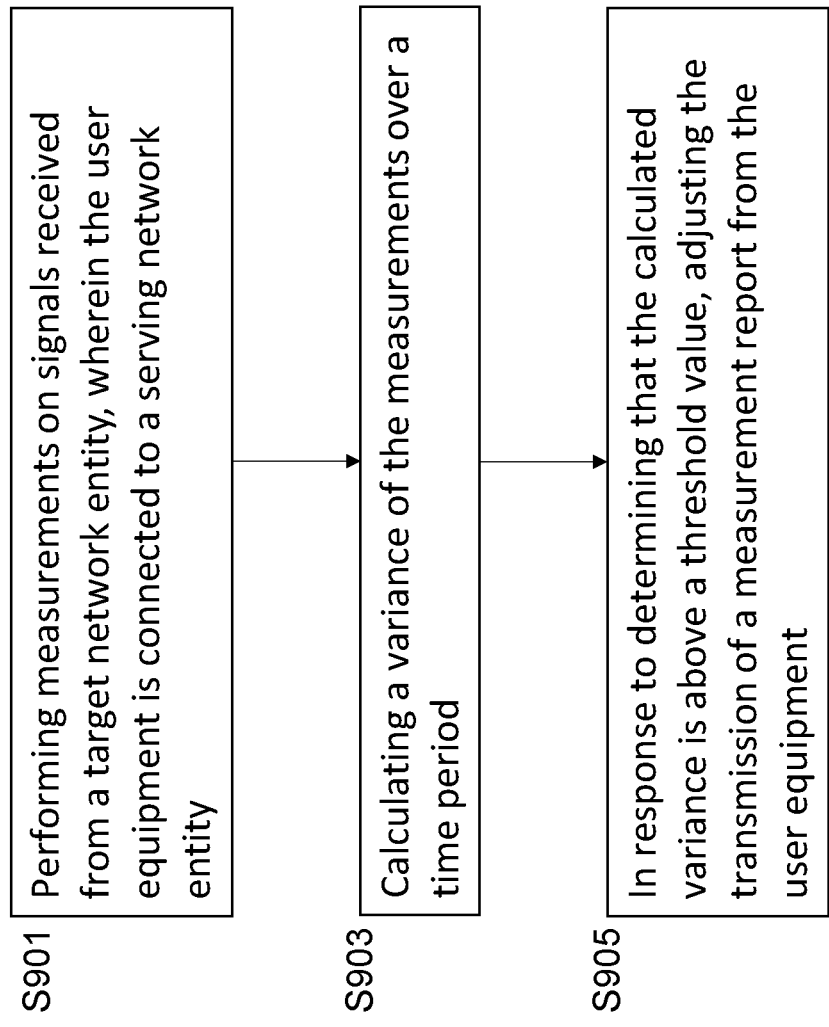

S901 Performing measurements on signals received from a target network entity, wherein the user equipment is connected to a serving network entity S903 Calculating a variance of the measurements over a time period S905 In response to determining that the calculated variance is above a threshold value, adjusting the transmission of a measurement report from the user equipment

Figure 9

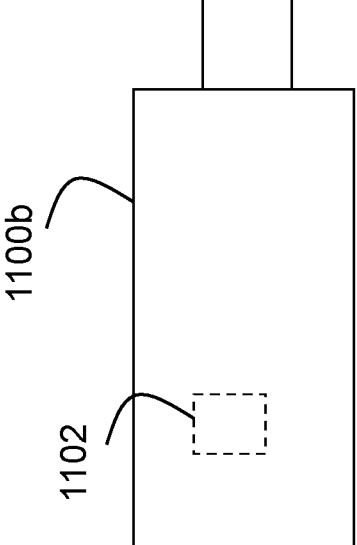
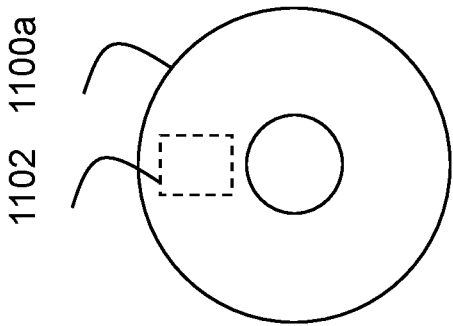
Figure 10

METHOD, APPARATUS AND COMPUTER PROGRAM

CROSS REFERENCE TO RELATED APPLICATION

This patent application is a U.S. National Stage application of International Patent Application Number PCT/EP2021/052528 filed Feb. 3, 2021, which is hereby incorporated by reference in its entirety.

FIELD

The present application relates to a method, apparatus, and computer program for a wireless communication system.

BACKGROUND

A communication system may be a facility that enables communication sessions between two or more entities such as user terminals, base stations/access points and/or other nodes by providing carriers between the various entities involved in the communications path. A communication system may be provided, for example, by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet.

SUMMARY

According to an aspect, there is provided an apparatus in a user equipment, the apparatus comprising: one or more processors, and memory storing instructions that, when executed by the one or more processors, cause the apparatus to: perform measurements on signals received from a target network entity, wherein the user equipment is connected to a serving network entity; calculate a variance of the measurements over a time period; and in response to determining that the calculated variance is above a threshold value, adjust the transmission of a measurement report from the user equipment.

In an example, the one or more processors, and memory storing instructions, when executed by the one or more processors, cause the apparatus to: delay the transmission of the measurement report.

In an example, the one or more processors, and memory storing instructions, when executed by the one or more processors, cause the apparatus to: adjust a trigger event for the measurement report.

In an example, the one or more processors, and memory storing instructions, when executed by the one or more processors, cause the apparatus to: add an offset value to the trigger event for the measurement report.

In an example, the one or more processors, and memory storing instructions, when executed by the one or more processors, cause the apparatus to: increase a time to trigger parameter used for reporting the measurement report.

In an example, the one or more processors, and memory storing instructions, when executed by the one or more processors, cause the apparatus to: perform measurements on signals received from the serving network entity; and compare the measurements from the serving network entity and the target network entity to determine the trigger event.

The trigger event may be an A3 event.

The first network entity may be a terrestrial network entity and the second network entity may be a non-terrestrial network.

The terrestrial network entity may be a base station and the non-terrestrial network entity may be a satellite.

The measurements may comprise: RSRP measurements and/or RSRQ measurements.

In an example, the one or more processors, and memory storing instructions, when executed by the one or more processors, cause the apparatus to: in response to determining that the calculated variance is below a threshold value, abstain from adjusting transmitting the measurement report.

In an example, the one or more processors, and memory storing instructions, when executed by the one or more processors, cause the apparatus to: in response to determining that the calculated variance is above a plurality of threshold values, adjust the transmission of a measurement report from the user equipment.

According to another aspect, there is provided an apparatus in a user equipment, the apparatus comprising means configured to perform: performing measurements on signals received from a target network entity, wherein the user equipment is connected to a serving network entity; calculating a variance of the measurements over a time period; and in response to determining that the calculated variance is above a threshold value, adjusting the transmission of a measurement report from the user equipment.

In an example, the means configured to perform adjusting the transmission are further configured to perform: delaying the transmission of the measurement report.

In an example, the means configured to perform adjusting the transmission are further configured to perform: adjusting a trigger event for the measurement report.

In an example, the means configured to perform adjusting the transmission are further configured to perform: adding an offset value to the trigger event for the measurement report.

In an example, the means configured to perform adjusting the transmission are further configured to perform: increasing a time to trigger parameter used for reporting the measurement report.

In an example, the means are further configured to performing: performing measurements on signals received from the serving network entity; and comparing the measurements from the serving network entity and the target network entity to determine the trigger event.

The trigger event may be an A3 event.

The first network entity may be a terrestrial network entity and the second network entity may be a non-terrestrial network.

The terrestrial network entity may be a base station and the non-terrestrial network entity may be a satellite.

The measurements may comprise: RSRP measurements and/or RSRQ measurements.

In an example, the means are further configured to perform: in response to determining that the calculated variance is below a threshold value, abstaining from adjusting transmitting the measurement report.

In an example, the means are further configured to perform: in response to determining that the calculated variance is above a plurality of threshold values, adjusting the transmission of a measurement report from the user equipment.

According to another aspect, there is provided a method performed by a user equipment, the method comprising:

performing measurements on signals received from a target network entity, wherein the user equipment is connected to a serving network entity; calculating a variance of the measurements over a time period; and in response to determining that the calculated variance is above a threshold value, adjusting the transmission of a measurement report from the user equipment.

In an example, adjusting the transmission comprises delaying the transmission of the measurement report.

In an example, adjusting the transmission comprises adjusting a trigger event for the measurement report.

In an example, adjusting the transmission comprises adding an offset value to the trigger event for the measurement report.

In an example, adjusting the transmission comprises increasing a time to trigger parameter used for reporting the measurement report.

In an example, the method comprises: performing measurements on signals received from the serving network entity; and comparing the measurements from the serving network entity and the target network entity to determine the trigger event.

The trigger event may be an A3 event.

The first network entity may be a terrestrial network entity and the second network entity may be a non-terrestrial network.

The terrestrial network entity may be a base station and the non-terrestrial network entity may be a satellite.

The measurements may comprise: RSRP measurements and/or RSRQ measurements.

In an example, the method comprises: in response to determining that the calculated variance is below a threshold value, abstaining from adjusting transmitting the measurement report.

In an example, the method comprises: in response to determining that the calculated variance is above a plurality of threshold values, adjusting the transmission of a measurement report from the user equipment.

According to another aspect, there is provided a computer program comprising computer executable instructions which when run on one or more processors perform: performing measurements on signals received from a target network entity, wherein the user equipment is connected to a serving network entity; calculating a variance of the measurements over a time period; and in response to determining that the calculated variance is above a threshold value, adjusting the transmission of a measurement report from the user equipment.

A computer product stored on a medium may cause an apparatus to perform the methods as described herein.

An electronic device may comprise apparatus as described herein.

In the above, various aspects have been described. It should be appreciated that further aspects may be provided by the combination of any two or more of the various aspects described above.

Various other aspects and further embodiments are also described in the following detailed description and in the attached claims.

According to some aspects, there is provided the subject matter of the independent claims. Some further aspects are defined in the dependent claims. The embodiments that do not fall under the scope of the claims are to be interpreted as examples useful for understanding the disclosure.

List of Abbreviations

AF: Application Function
AUSF: Authentication Server Function

AMF: Access Management Function
AN: Access Network
BS: Base Station
DL: Downlink
eNB: eNodeB
GEO: Geostationary Earth Orbit
gNB: gNodeB
GNSS: Global Navigation Satellite System
LEO: Low Earth Orbit
LTE: Long Term Evolution
NEF: Network Exposure Function
NG-RAN: Next Generation Radio Access Network
NF: Network Function
NR: New Radio
NRF: Network Repository Function
NTN: Non-Terrestrial Network
NW: Network
MS: Mobile Station
MT: Mobile Termination
RAN: Radio Access Network
RF: Radio Frequency
RSRP: Reference Signal Received Power
RSRQ: Reference Signal Received Quality
RTT: Round Trip Time
SMF: Session Management Function
TN: Terrestrial Network
UE: User Equipment
UL: Uplink
UPF: User Plane Function
3GPP: $3^{rd}$ Generation Partnership Project
5G: $5^{th}$ Generation
5GC: 5G Core network
5G-AN: 5G Radio Access Network
5GS: 5G System

DESCRIPTION OF FIGURES

Embodiments will now be described, by way of example only, with reference to the accompanying Figures in which:

FIG. 9 shows another example method flow diagram performed by a network entity; and FIG. 10 shows a schematic representation of a non-volatile memory medium storing instructions which when executed by a processor allow a processor to perform one or more of the steps of the method of FIG. 9.

DETAILED DESCRIPTION

Before explaining in detail some examples of the present disclosure, certain general principles of a wireless communication system and mobile communication devices are briefly explained with reference to FIGS. 1 to 3 to assist in understanding the technology underlying the described examples.

Figure 1:
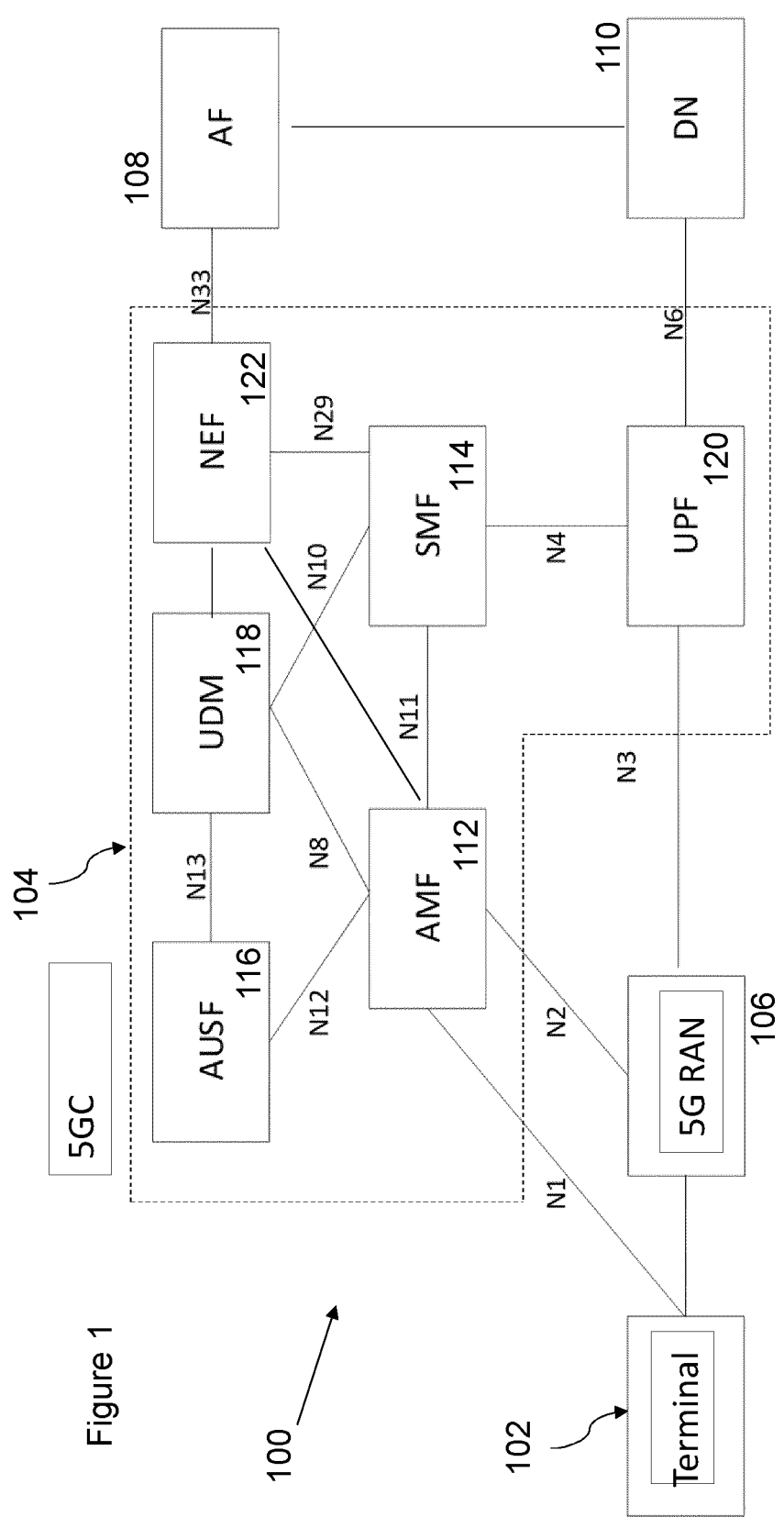
FIG. 1 shows a schematic representation of a 5G system.

In a wireless communication system 100, such as that shown in FIG. 1, mobile communication devices/terminals or user apparatuses, and/or user equipments (UE), and/or machine-type communication devices 102 are provided wireless access via at least one base station (not shown) or similar wireless transmitting and/or receiving node or point. A communication device is provided with an appropriate signal receiving and transmitting apparatus for enabling communications, for example enabling access to a communication network or communications directly with other devices. The communication device may access a carrier provided by a station or access point, and transmit and/or receive communications on the carrier.

In the following certain examples are explained with reference to mobile communication devices capable of communication via a wireless cellular system and mobile communication systems serving such mobile communication devices. Before explaining in detail the examples of disclose, certain general principles of a wireless communication system, access systems thereof, and mobile communication devices are briefly explained with reference to FIGS. 1, 2 and 3 to assist in understanding the technology underlying the described examples.

FIG. 1 shows a schematic representation of a 5G system (5GS) 100. The 5GS may comprises a terminal 102, a 5G access network (5G-AN) 106, a 5G core network (5GC) 104, one or more network functions (NF), one or more application function (AF) 108 and one or more data networks (DN) 110.

The 5G-AN 106 may comprise one or more gNodeB (gNB) distributed unit functions connected to one or more gNodeB (gNB) centralized unit functions.

The 5GC 104 may comprise an access management function (AMF) 112, a session management function (SMF) 114, an authentication server function (AUSF) 116, a user data management (UDM) 118, a user plane function (UPF) 120, a network exposure function (NEF) 122 and/or other NFs. Some of the examples as shown below may be applicable to 3GPP 5G standards. However, some examples may also be applicable to 4G, 3G and other 3GPP standards.

Figure 5:
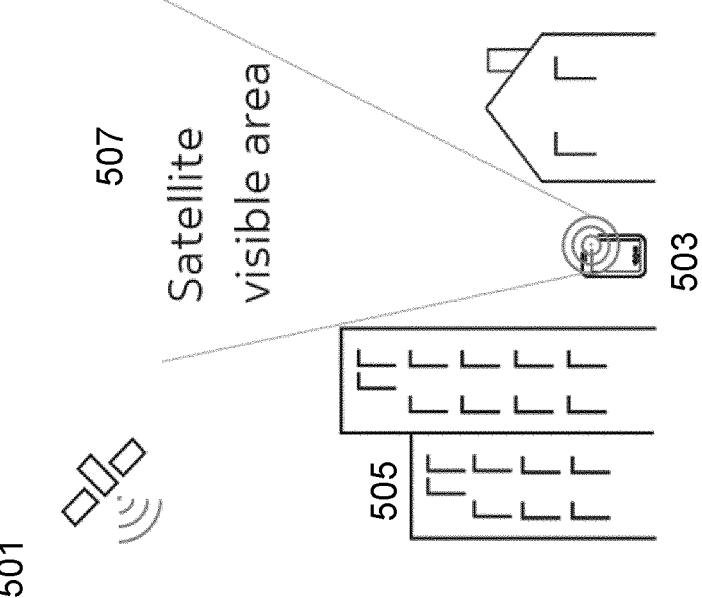
FIG. 5 shows a schematic representation of a non-terrestrial communication network.
Figure 6:
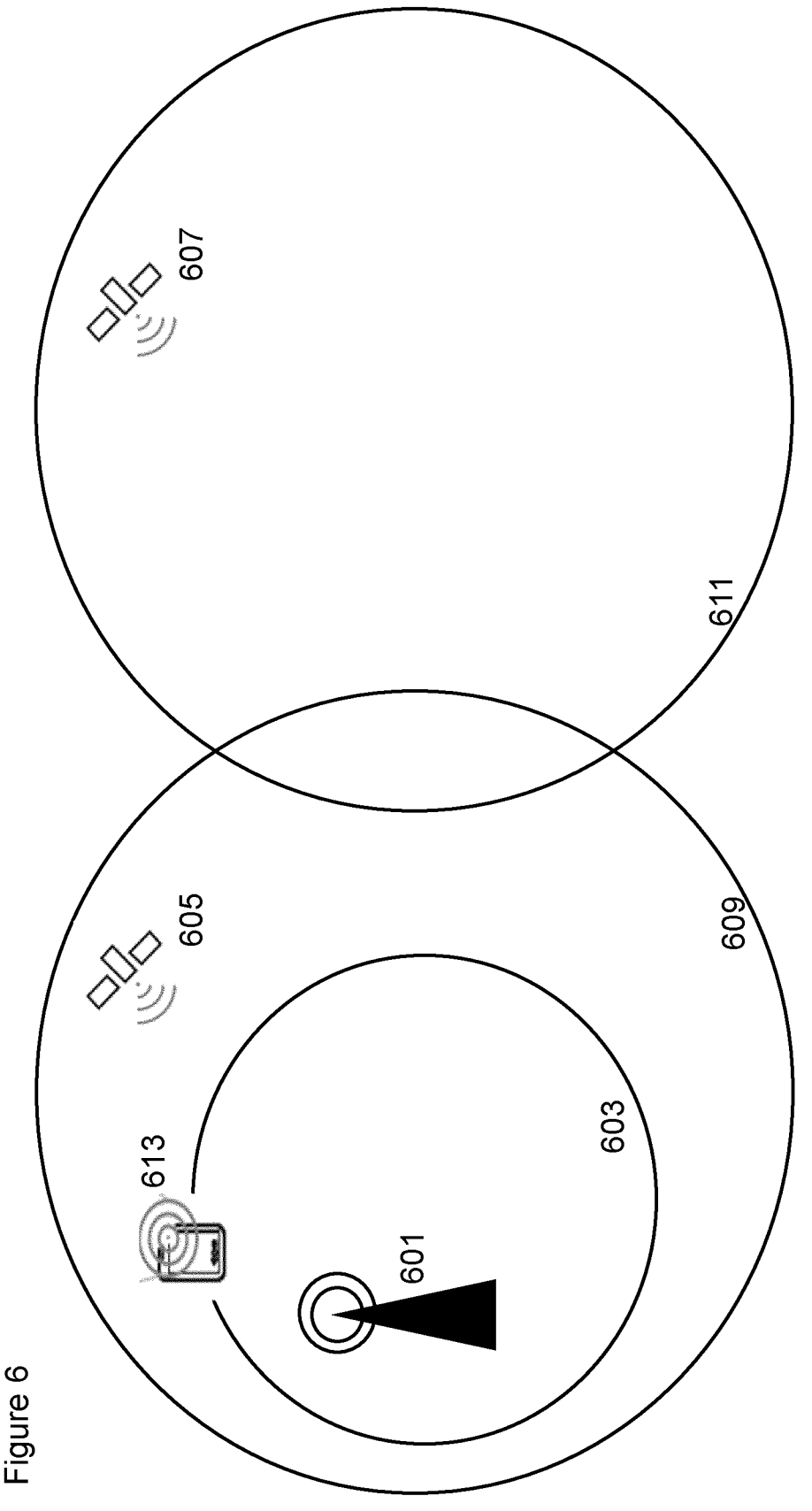
FIG. 6 shows another schematic representation of a network architecture for terrestrial and non-terrestrial communication networks.

In a communication system, such as that shown in FIG. 1, mobile communication devices/terminals or user apparatuses, and/or user equipments (UE), and/or machine-type communication devices are provided with wireless access via at least one base station or similar wireless transmitting and/or receiving node or point. The terminal is provided with an appropriate signal receiving and transmitting apparatus for enabling communications, for example enabling access to a communication network or communications directly with other devices. The communication device may access a carrier provided by a station or access point, and transmit and/or receive communications on the carrier. Terminal 102 is also depicted in FIG. 5, with labels 10, 16, 19, 20A, 20B. Terminal 102 is also depicted in FIG. 6 with label 601, for example. The terminal 102 may use communications services. Two or more terminals may use the same communications services. In other examples, two or more terminals may have different services from each other.

Figure 2:
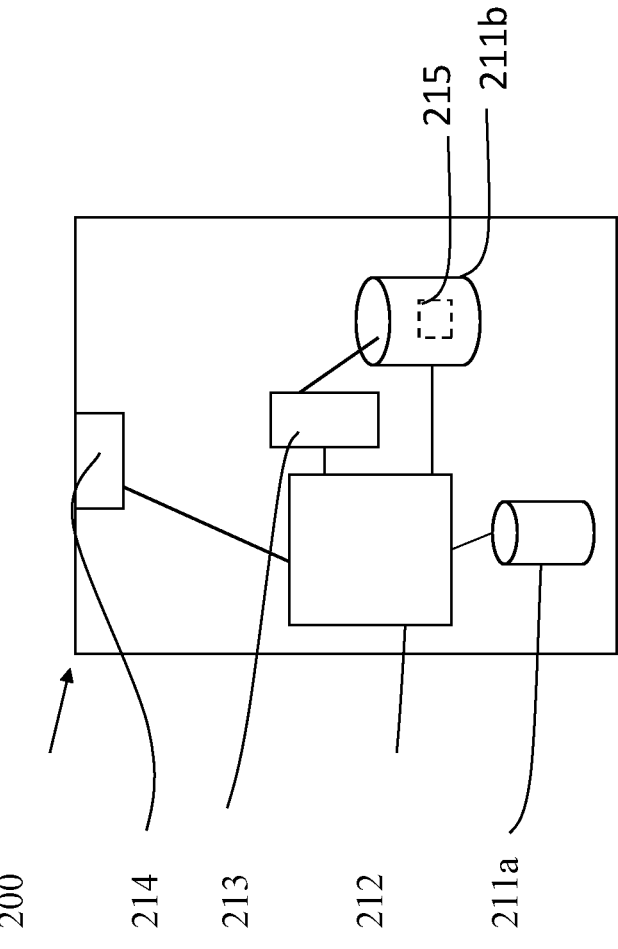
FIG. 2 shows a schematic representation of a control apparatus.

FIG. 2 illustrates an example of a control apparatus 200 for controlling a function of the 5G-AN or the 5GC as illustrated on FIG. 1. The control apparatus may comprise at least one random access memory (RAM) 211a, at least on read only memory (ROM) 211b, at least one processor 212, 213 and an input/output interface 214. The at least one processor 212, 213 may be coupled to the RAM 211a and the ROM 211b. The at least one processor 212, 213 may be configured to execute an appropriate software code 215. The software code 215 may for example allow to perform one or more steps to perform one or more of the present aspects. The software code 215 may be stored in the ROM 211b. The control apparatus 200 may be interconnected with another control apparatus 200 controlling another function of the 5G-AN or the 5GC. In some examples, each function of the 5G-AN or the 5GC comprises a control apparatus 200. In alternative examples, two or more functions of the 5G-AN or the 5GC may share a control apparatus.

Figure 3:
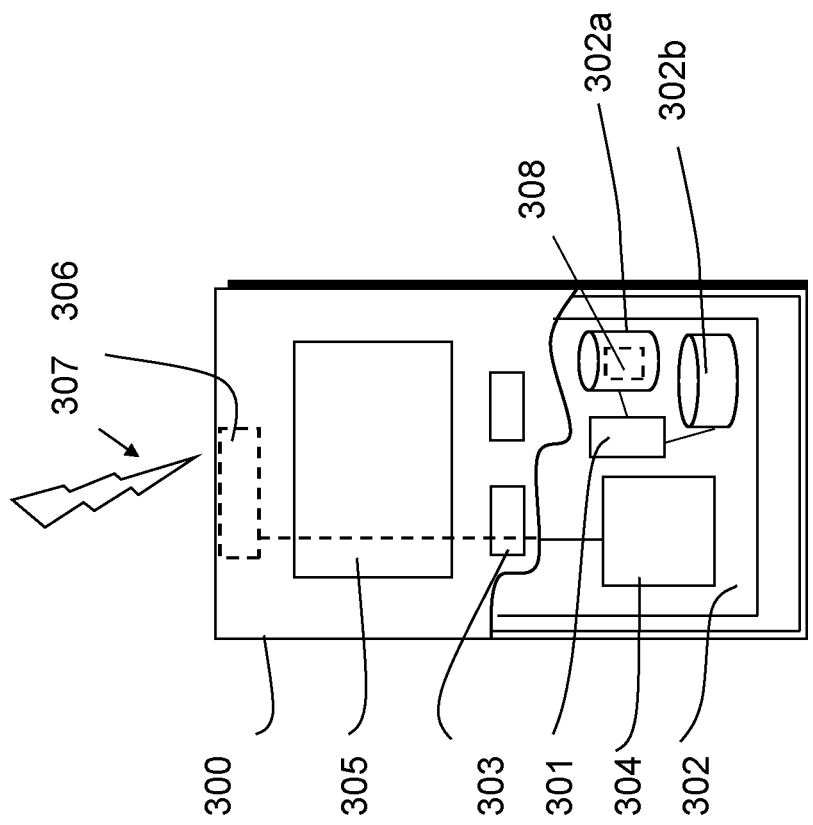
FIG. 3 shows a schematic representation of a terminal.

FIG. 3 illustrates an example of a terminal 300, such as the terminal illustrated on FIG. 1. The terminal 300 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, a Cellular Internet of things (CIoT) device or any combinations of these or the like. The terminal 300 may provide, for example, communication of data for carrying communications. The communications may be one or more of voice, electronic mail (email), text message, multimedia, data, machine data and so on.

The terminal 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The terminal 300 may be provided with at least one processor 301, at least one memory ROM 302a, at least one RAM 302b and other possible components 303 for use in software and hardware aided execution of tasks it is designed to perform, including control of access to and communications with access systems and other communication devices. The at least one processor 301 is coupled to the RAM 302a and the ROM 211b. The at least one processor 301 may be configured to execute an appropriate software code 308. The software code 308 may for example allow to perform one or more of the present aspects. The software code 308 may be stored in the ROM 302b.

The processor, storage and other relevant control apparatus may be provided on an appropriate circuit board and/or in chipsets. This feature is denoted by reference 304. The device may optionally have a user interface such as keypad 305, touch sensitive screen or pad, combinations thereof or the like. Optionally one or more of a display, a speaker and a microphone may be provided depending on the type of the device.

Some of the following examples are related to terrestrial networks (TN) and non-terrestrial networks (NTN). In this context, an NTN includes all networks which use an airborne or spaceborne platform as a part of the network. For example, satellites, high-altitude platforms or drones. Satellites can be classified in terms of their altitude, such as low-Earth orbit (LEO) and geostationary Earth orbit (GEO) satellites. LEO satellites are deployed in large constellations and move with respect to the Earth's surface. LEO satellites may have a speed of approximately 7.5 km/s to maintain their orbit. A LEO satellite may have an earth orbit time of approximately 90 minutes. An advantage of LEO satellites is a global and high-speed communication link with a low delay in comparison to traditional Geostationary Earth orbit (GEO). This may be due to the LEO satellites having a lower round-trip time (RTT). A GEO satellite has an earth orbit time of 24 hours and stay is the same place with respect to the Earth. The movement of the LEO satellite with respect to the Earth is one of the main challenges for LEO communications and can lead to very frequent handovers. Frequent handovers may occur even if the UE is not moving.

Terrestrial networks include radio access networks, such as 4G and 5G networks.

A user equipment (UE) may be connected to a TN or an NTN for data communications. Sometimes, a UE may handover from a TN to an NTN. In other times, a UE may handover from an NTN to a TN. Some of the examples discussed below and related to handover between TNs and NTNs.

A handover is an example of a mobility event. The number of mobility events may depend on the cell sizes. Cell sizes may range from, for example, around 30 km radius to several 100 kms. Even though many UEs have Global Navigation Satellite System (GNSS) capability there are many disadvantages with regard to using this feature. One of the disadvantages of using GNSS in UEs is that it drains the UE battery. Furthermore, the location can be jammed and/or unavailable, and inaccurate for the intended mobility purposes. Therefore, some of the examples discussed below show methods for handover without using GNSS capabilities.

Some mobility algorithms rely on UE measurements from the serving and neighbouring cells. UE measurement may include, for example, reference signal received power (RSRP) and reference signal received quality (RSRQ). The UE may send a measurement report when one of the network configured measurement triggers has been triggered. As an example, a list of measurement triggers for long-term evolution (LTE) can be seen in Table 1 below.

Some of the following examples are related to the A3 event. It should be understood that the mechanisms disclosed are also application to the other events identified in Table 1. Event A3 can be calculated with the below equation:

$$Mn + Ofn + Ocn - Hys > Mp + Ofp + Ocp + Off$$

wherein:

Mn=neighbour cell measurement (RSRP or RSRQ)

Mp=serving cell measurement (RSRP or RSRQ)

Ofn, Ofp=frequency dependent offsets for neighbour and serving cell

Ocn, Ocp=cell dependent offsets for neighbour and serving cell

Hys=hysteresis

Off=Offset

The criteria for each event must be satisfied during at least the time to trigger. The time to trigger can be configured independently for each reporting event.

When these conditions are fulfilled the network can, based on a measurement report sent by a UE to the network, decide to make a handover. There may be locations on Earth where both a terrestrial network and an NTN are available at the same time. In these cases, the allocation of a UE to either the TN or NTN will be determined.

Figure 4:
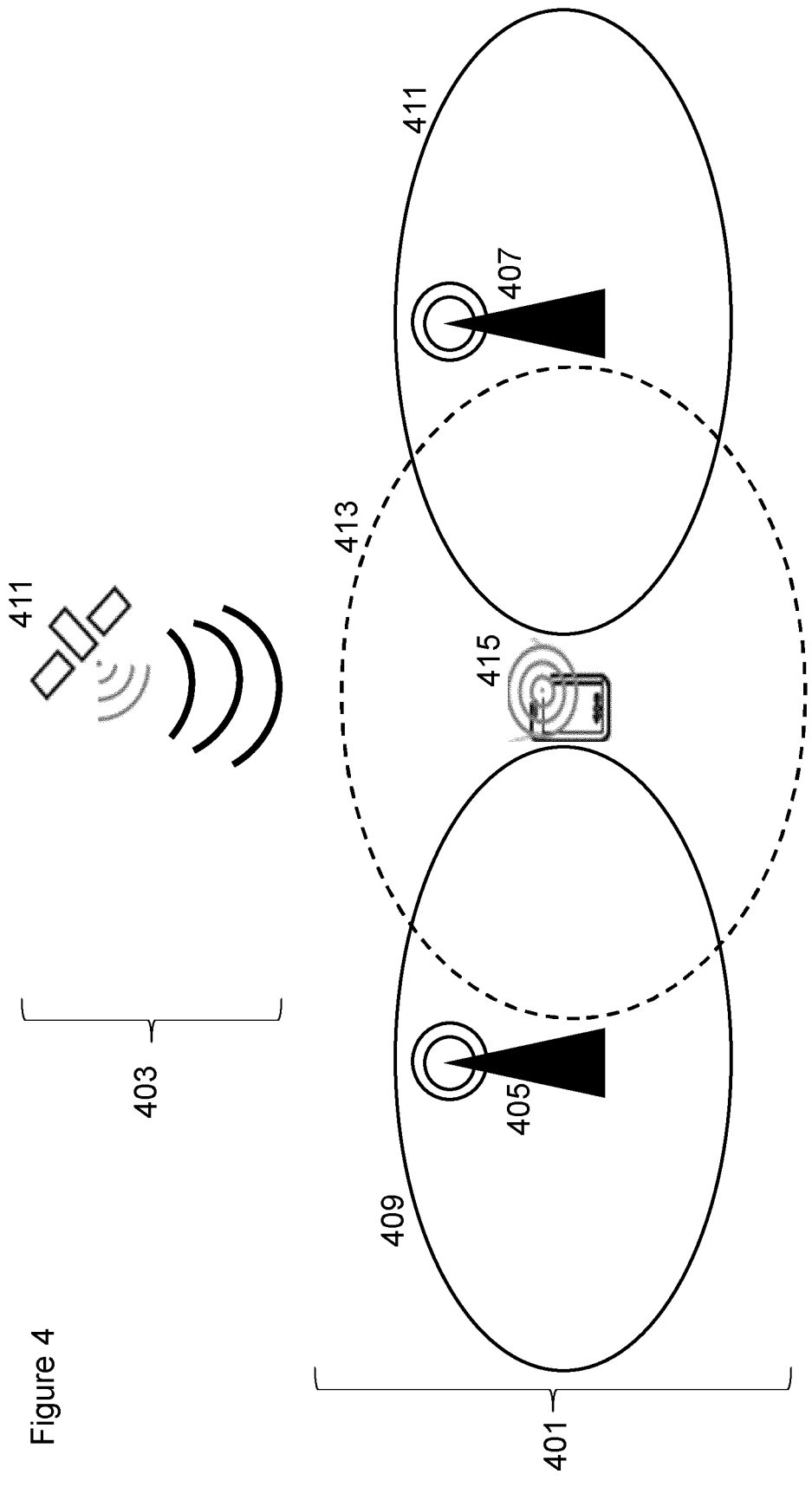
FIG. 4 shows a schematic representation of a network architecture for terrestrial and non-terrestrial communication networks.

FIG. 4 shows a schematic representation of a network architecture for terrestrial and non-terrestrial communication networks. There are two layers provided in FIG. 4, including a terrestrial layer 401 and a non-terrestrial layer 403. The terrestrial layer 401 comprises a first base station 405 and a second base station 407. As an example, the first and second base stations 405, 407 may be gNodeBs. The first base station 405 has a first cell area 409. The second base station 405 has a second cell area 411. The non-terrestrial layer comprises a satellite 413. The satellite 413 has a satellite area 415. The satellite area 415 represents the area on the ground with a direct line of sight to the satellite 415. Therefore, in other examples, the shape of the satellite area 415 may be different.

TABLE 1

| Measurement triggers in LTE | |
| --- | --- |
| Event Type | Description |
| Event A1 | Serving becomes better than threshold |
| Event A2 | Serving becomes worse than threshold |
| Event A3 | Neighbour becomes offset better than serving |
| Event A4 | Neighbour becomes better than threshold |
| Event A5 | Serving becomes worse than threshold1 and neighbour becomes better than threshold2 |
| Event A6 | Neighbour become offset better than S Cell (This event is introduced in Release 10 for CA) |
| Event B1 | Inter RAT neighbour becomes better than threshold |
| Event B1-NR | NR neighbour becomes better than threshold |
| Event B2 | Serving becomes worse than threshold1 and inter RAT neighbour becomes better than threshold2 |
| Event B2-NR | Serving becomes worse than threshold1 and NR neighbour becomes better than threshold2 |
| Event C1 | CSI-RS resource becomes better than threshold |
| Event C2 | CSI-RS resource becomes offset better than reference CSI-RS resource |
| Event W1 | WLAN becomes better than a threshold |
| Event W2 | All WLAN inside WLAN mobility set becomes worse than threshold1 and a WLAN outside WLAN mobility set becomes better than threshold2 |
| Event W3 | All WLAN inside WLAN mobility set becomes worse than a threshold |
| Event V1 | The channel busy ratio is above a threshold |
| Event V2 | The channel busy ratio is below a threshold |
| Event H1 | The Aerial UE height is above a threshold |
| Event H2 | The channel busy ratio is below a threshold |

There is also provided a user equipment 415. The user equipment may be able to connect to either the first base station 405, the second base station 407, or the satellite 411 based on the location of the user equipment 415. When connecting to the satellite 411, obstructions to the line of sight between the user equipment and the satellite 411 may mean that a connection is not possible.

A handover between base stations may be based on a measured signal strength by the UE, as explained above. In a given scenario with TN and NTN available, several situations with temporarily varying signals can occur. One example is shown in FIG. 5. In FIG. 5 there is provided a satellite 501 in orbit. The satellite is capable of providing a communication link for user equipment devices. There is also provided a user equipment 503. The user equipment 503 is located in a city with tall buildings 505. The tall buildings block the line of sight to the satellite 501. The area in the sky that is visible to the user equipment is shown by label 507. In the example of FIG. 5, the buildings 505 block the user equipment's 503 line of sight to the satellite 501.

In this case, due to the obstructions 505 in the line of sight, the satellite 501 is only visible in high elevation angles. Further examples for obstructions are street canyons, local obstructing objects or mountains. This results in a varying satellite visibility over time. In this case, it may not be preferable to use the NTN, even if the signal strength is better at a specific point in time. This may lead to frequent handovers, which is undesirable.

A further example is shown in FIG. 6. FIG. 6 shows a base station 601 with a cell area 603. There is also provided a first satellite 605 and a second satellite 607. The first and second satellites 605, 607 have overlapping satellite areas 609, 611. In the example of FIG. 6, there is a user equipment 613 located on the edge of the cell area 603, but within the first satellite area 609. When the user equipment 615 is at the cell 603 edge then a connection to the base station 601 may be sporadic. In this case, the NTN network, the satellite 605, should be preferred. Performing a handover and connecting to the base station 601 may lead to further handovers which may be unnecessary. Unnecessary handovers may waste network resources. Consequently, if the signal of the base station 601 is only temporarily good, as for instance in the above described examples, the best network should be chosen to avoid a reduced performance with frequent handovers.

In order to address one or more of the above-mentioned problem, some examples show a UE calculating a variance of measurements, wherein the measurements are taken over a longer time frame. The time frame is longer when compared to the normal L3 filtering duration for handover measurements. A normal L3 filtering duration may be the region of 100 ms to 500 ms. To identify the signal variance, the UE conducts the handover measurements over a longer time. The UE may perform the measurements, for example, in the order of at least one minute. In other examples, the UE may measure for less than one minute. When the measurements show a high variance, this is an indication that the network is less attractive. To achieve this, two examples are discussed. Firstly, the UE can add an additional offset to a trigger event (measurement report trigger) for a measurement report. For example, an additional offset value is added to the equation 1 above. For example, an additional offset is added for determining event A3. The additional offset may avoid, block or delay measurement reporting, and thus a handover. In a second example, the UE uses a longer time to trigger parameter for the measurement report triggering. The time for the time to trigger parameter is longer when compared to a standard time to trigger parameter. By increasing this time to trigger, this may lead to fewer measurement reports.

Figure 7:
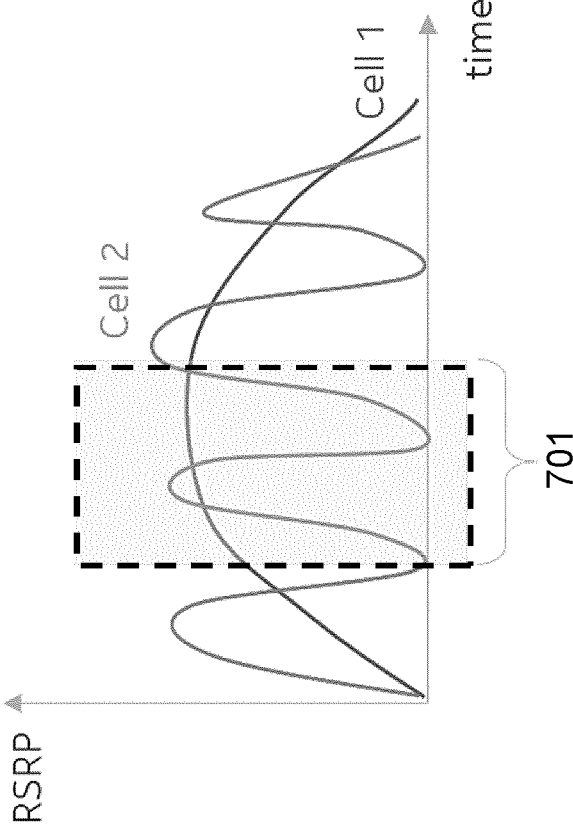
FIG. 7 shows an example graphical representation of signal measurements performed by a user equipment.

FIG. 7 shows an example graphical representation of signal measurements performed by a user equipment (UE). In the example of FIG. 7, the measurement metric is RSRP. In other examples, the UE may measure RSRQ or other suitable metrics. On the "Y-axis" of the graph is RSRP, and on the "X-axis" is time. In FIG. 7, a first line labelled "Cell 1" shows a measurement for terrestrial network. There is provided a second line labelled "Cell 2" which shows a measurement for a NTN. For Cell 1, the variance of the measurements within a time period 701 (as depicted by dashed box) is low. For Cell 2, the variance within the time period 701 is high. The Cell 2 line shows high peaks and deep troughs within time period 701, which is leading to a large variance. There are many reasons why this could be the case. For example, the UE may be present in a car that is in motion. That car may be driving through a city street with tall buildings on either side of the car. Therefore, the measurements are showing troughs every time a building blocks the UE's line of sign to the NTN. In short bursts, the UE may "see" the satellite and then it disappears again. Cell 2 has a higher measured RSRP at some points compared to Cell 1. However, Cell 2 is not to be selected for a handover due to the high variance. In other examples, the UE remains still and the orbit movement of the satellite means that the line of sight between the UE and satellite is occasionally blocked.

In order to avoid the selection of Cell 2 for a handover, two examples are presented. Firstly, an additional offset is added to a trigger event calculation. This may reduce the likelihood of trigger a measurement report to be sent by a UE. This may reduce the change of a handover. Secondly, the UE uses a longer time to trigger for the measurement report. This may reduce the likelihood of handover. This procedure is described in detail below with FIG. 8.

Figure 8:
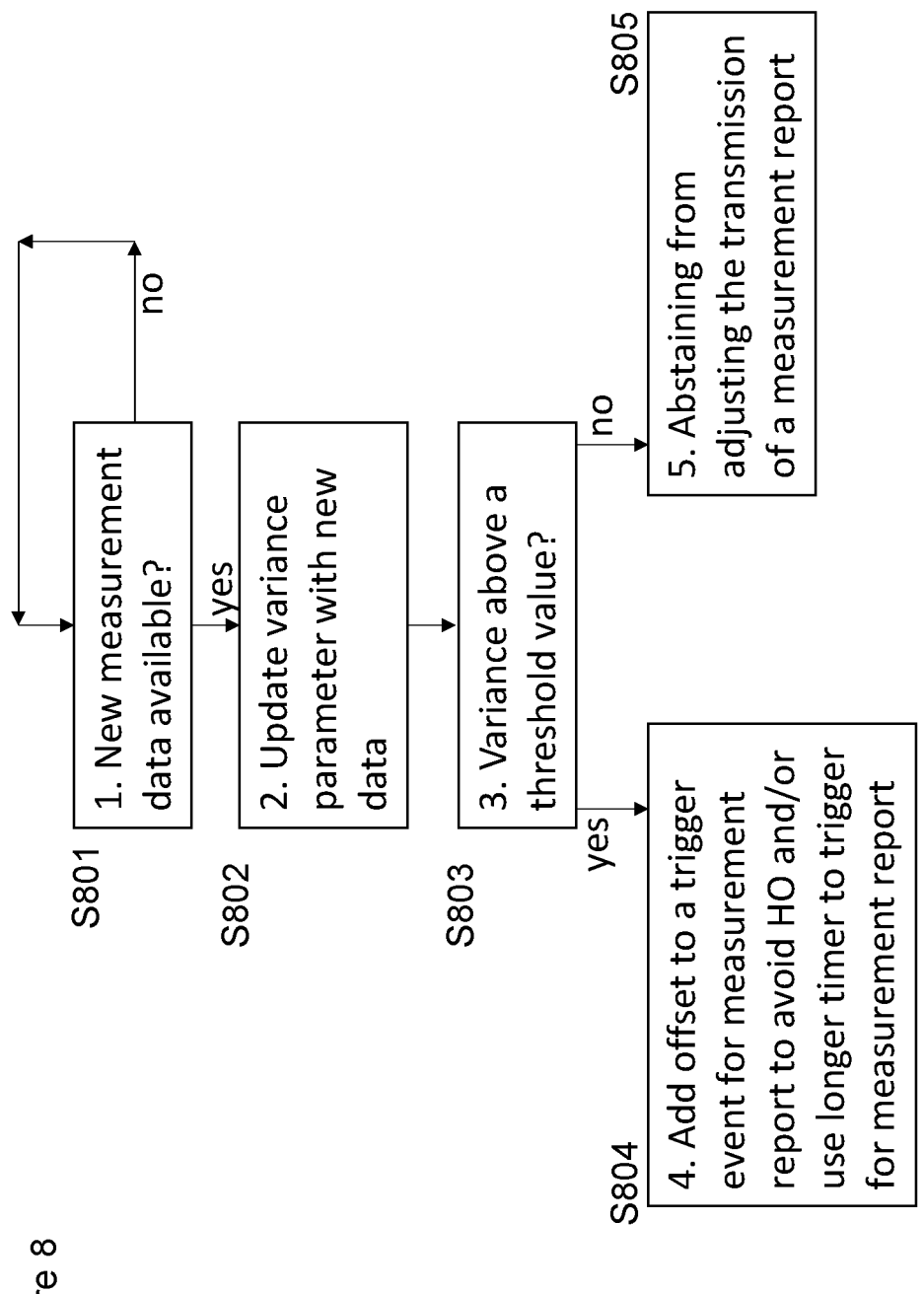
FIG. 8 shows an example method flow diagram performed by a network entity.

FIG. 8 shows an example method flow diagram performed by a user equipment (UE). In this example, the UE may be configured using event-based measurement reporting. The UE may send a measurement report when an event is determined, such as one of the events listed in table 4.

At S801, the UE may perform measurements on received signals to gather measurement data. The UE may receive signals from the serving cell. The UE may also receive signals from one or more target/neighbour cells. In an example, the UE determines RSRP measurements for the received signals. In another example, the UE determined RSRQ measurements for the received signals. In another example, other suitable measurements are performed by the UE.

At S802, the UE calculates a variance value for the measurement data over a time period. The variance value may be calculated for a target/neighbouring cell. In an example, the serving network is a TN and the neighbour network is an NTN. As an example, the time period may be 30 seconds or more. In another example, the time period may be at least one minute.

At S803, the UE determines whether the calculated variance value is above or below a threshold. The threshold may be predetermined. In some examples, the threshold may be received at the UE from a network. In another example, a plurality of threshold values are used. In this instance, it is determined whether the variance value is above it below the plurality of threshold values.

At S804, the UE determines that the calculated variance is above the threshold value. When the variance is above the threshold the UE may adjust transmitting a measurement report to a base station. In some examples, the UE may delay the transmitting of the measurement report.

In some examples, the UE will delay by adding an additional offset value to a trigger event. For example, with the A3 event as discussed above, an additional offset is added to the right-hand side of the equation:

$$Mn+Ofn+Ocn-\text{Hys}>Mp+Ofp+Ocp+\text{Off}+\text{AddOff}$$

By including the additional offset in the trigger event equation, the equation is weighted in the favour of the serving cell compared to the target cell. In this way, for example, a fluctuating RSRP measurement with a high variance may not trigger an A3 event. Typically, if a measurement report is transmitted indicating an A3 event, the network will initiate a handover. As discussed previously, performing a handover to a network with measurements showing a high variance may be problematic and lead to excessive handovers. It should be understood that event A3 is used an example only, to aid in the understanding of these examples. The same mechanism is equally application to other trigger events.

When the UE determines that the calculated variance is below the threshold value, in some other examples, the UE increases a value for a time to trigger parameter for sending the measurement report. As discussed above, the criteria for each event needs to be satisfied for the duration of the time to trigger parameter for the event to trigger. In an example, the UE is configured with a first time to trigger parameter and a second time to trigger parameter. The second time to trigger parameter may be greater in duration compared to the first time to trigger parameter. In some example, when the UE determines that the calculated variance is below the threshold value the UE starts to use the second time to trigger parameter.

In some example, when the UE determines that the calculated variance is below the threshold value, the UE will add the additional offset and increase the value for the time to trigger parameter. In this way, the UE will attempt to avoid handover when the UE has measured a high variance in the measurements for the neighbour network.

At S805, when the UE determines that the calculated variance is below the threshold value, the UE does not adjust the transmission of the measurement report to the network.

As an example only, the UE may be connected to a TN as a serving network. The UE may be measuring RSRP for reference signals received from an NTN, such as a satellite. The value of the measured RSRP may be higher than the serving cell in certain locations, however the variance determined to be higher than a threshold value. This may be due to buildings in a city blocking a line of sight with the satellite. In previous systems, the high RSRP measured for the NTN may trigger an event, and a handover. However, as the measured RSRP value lowers when the line of sight is blocked, the UE will need to handover again back to the TN. Examples of the present disclosure using the calculated variance value means that a handover to the NTN is likely blocked or delayed. Therefore, an unnecessary handover is avoided, and network resources are saved.

As a summary, some advantages of one or more of the examples discussed above is that by monitoring the long-term variance of the signal strength, handovers resulting in a bad performance are avoided and the handover frequency is reduced. One or more of the examples discussed above allow a variance value calculated by a user equipment to be used in the handover procedure. When a high variance is calculated a handover can be avoided. This reduces the frequency of unnecessary handovers being performed, and network resources are saved.

FIG. 9 shows an example method flow performed by an apparatus. The apparatus may be comprised within a network entity. In an example, the apparatus may be comprised within a user equipment.

In S901, the method comprises performing measurements on signals received from a target network entity, wherein the user equipment is connected to a serving network entity.

In S903, the method comprises calculating a variance of the measurements over a time period.

In S905, the method comprises, in response to determining that the calculated variance is above a threshold value, adjusting the transmission of a measurement report from the user equipment.

FIG. 10 shows a schematic representation of non-volatile memory media 1100a (e.g. computer disc (CD) or digital versatile disc (DVD)) and 1100b (e.g. universal serial bus (USB) memory stick) storing instructions and/or parameters 1102 which when executed by a processor allow the processor to perform one or more of the steps of the method of FIG. 9.

It is noted that while the above describes example embodiments, there are several variations and modifications which may be made to the disclosed solution without departing from the scope of the present invention.

The examples may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The examples may be implemented by computer software stored in a memory and executable by at least one data processor of the involved entities or by hardware, or by a combination of software and hardware. Further in this regard it should be noted that any procedures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples.

Alternatively, or additionally some examples may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:

(a) hardware-only circuit implementations (such as implementations in only analogue and/or digital circuitry);

(b) combinations of hardware circuits and software, such as:

(i) a combination of analogue and/or digital hardware circuit(s) with software/firmware and (ii) any portions of hardware processor(s) with software (including digital signal processor(s)), software, and memory(ies) that work together to cause an apparatus, such as the communications device or base station to perform the various functions previously described; and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:

1. An apparatus in a user equipment, the apparatus comprising:

at least one processor; and at least one non-transitory memory storing instructions that, when executed with the at least one processor, cause the apparatus to:

perform measurements on signals received from a target network entity, wherein the user equipment is connected to a serving network entity, wherein the serving network entity is a terrestrial network comprising a base station and the target network entity is a non-terrestrial network comprising a satellite, wherein the measurements comprise reference signal received power measurements and reference signal received quality measurements;

calculate a variance of the measurements over a time period, wherein the time period is at least one minute;

in response to determining that the calculated variance is above a threshold value, adjust transmission of a measurement report from the user equipment, wherein adjusting the transmission comprises delaying the transmission of the measurement report, adjusting a trigger event for the measurement report by adding an offset value to the trigger event for the measurement report and by adding an additional offset to an A3 event equation, and increasing a time to trigger parameter used for reporting the measurement report;

perform measurements on signals received from the serving network entity; and compare the measurements from the serving network entity and the target network entity to determine the trigger event, wherein the trigger event is an A3 event calculated according to the A3 event equation:

$$Mn+Ofn+Ocn-\text{Hys}>Mp+Ofp+Ocp+\text{Off}+\text{AddOff},$$

wherein Mn is a neighbour cell measurement, Mp is a serving cell measurement, Ofn and Ofp are frequency dependent offsets for neighbour and serving cell, Ocn and Ocp are cell dependent offsets for neighbour and serving cell, Hys is hysteresis, Off is the offset value, and AddOff is the additional offset, wherein the additional offset weights the equation in favor of the serving cell compared to a target cell to avoid handover to the non-terrestrial network when the measurements show high variance due to satellite visibility varying over time.

* * * * *